United States Patent
Kawashima et al.

(10) Patent No.: US 7,888,623 B2
(45) Date of Patent: Feb. 15, 2011

(54) ILLUMINATION DEVICE AND DISPLAY DEVICE

(75) Inventors: Toshiyuki Kawashima, Saitama (JP); Shinji Ogawa, Tokyo (JP); Takeshi Kodama, Kanagawa (JP)

(73) Assignee: Sony Corporation (JP)

( * ) Notice: Subject to any disclaimer, the term of this patent is extended or adjusted under 35 U.S.C. 154(b) by 74 days.

(21) Appl. No.: 12/378,173

(22) Filed: Feb. 11, 2009

(65) Prior Publication Data

US 2009/0206236 A1 Aug. 20, 2009

(30) Foreign Application Priority Data

Feb. 14, 2008 (JP) ............... 2008-032743

(51) Int. Cl.
*G01J 1/32* (2006.01)
*H05B 37/02* (2006.01)
*F21V 9/00* (2006.01)

(52) U.S. Cl. .................. 250/205; 315/152; 362/231

(58) Field of Classification Search ................ 250/205, 250/216, 226, 214 C, 214 AL, 552, 553; 315/307, 308, 224, 149, 151, 152, 158, 361, 315/363; 362/227, 234, 85, 108, 230, 231; 257/79, 82, 88, 89

See application file for complete search history.

(56) References Cited

U.S. PATENT DOCUMENTS 7,052,138 B2 5/2006 Matsui 7,319,298 B2 * 1/2008 Jungwirth et al. ........... 315/307
2005/0254013 A1 11/2005 Engle et al.
2006/0028155 A1 2/2006 Young

FOREIGN PATENT DOCUMENTS

| JP | 2004-184852 A | 7/2004 |
|---|---|---|
| JP | 2004-226631 A | 8/2004 |
| JP | 2007-027421 A | 2/2007 |
| JP | 2007-087720 A | 4/2007 |
| JP | 2007-087816 A | 4/2007 |
| JP | 2007-165336 A | 6/2007 |
| JP | 2007-537490 T | 12/2007 |
| JP | 2008-509538 T | 3/2008 |

* cited by examiner

*Primary Examiner*—Georgia Y Epps
*Assistant Examiner*—Don Williams
(74) *Attorney, Agent, or Firm*—Lerner, David, Littenberg, Krumholz & Mentlik, LLP

(57) ABSTRACT

An illumination device includes: a light emitting element to be a light source; a light amount detecting means for detecting the amount of light emitted by the light emitting element; a light emitting element drive means for controlling drive current supplied to the light emitting element so that the difference between the light mount detected by the light amount detecting means and a light amount target value becomes small; a junction temperature detecting means for calculating junction temperature of the light emitting element; and a setting means for setting the light amount target value in accordance with the junction temperature detected by the junction temperature detecting means.

10 Claims, 3 Drawing Sheets

ILLUMINATION DEVICE AND DISPLAY DEVICE

CROSS REFERENCE TO RELATED APPLICATIONS

The present application claims priority from Japanese Patent Application No. JP 2008-032743, filed in the Japanese Patent Office on Feb. 14, 2008, the entire content of which is incorporated herein by reference.

BACKGROUND OF THE INVENTION

1. Field of the Invention

The invention relates to an illumination device and a display device including the same.

2. Description of the Related Art

In recent years, an illumination device using a light-emitting diode (hereinafter, "LED") as a light source is utilized in various fields. For example, in projective-type display devices, there exist a device including an illumination device having three types of LEDs as a light source, which generate light of wavelengths corresponding respective color components of red, green and blue which are three primary colors of light. The display device of this type adds lights generated by three types of LEDs to obtain white light. At that time, the color balance of white light obtained by combining three colors (hereinafter, "white balance") chiefly depends on the relative relationship of light intensity of respective colors. Usually, the white balance is adjusted at the time of factory shipping or the like, however, in actual use after that, there is a case that light-emitting characteristics of the LEDs vary due to temperature change or secular change and the white balance is lost.

For example, in the following JP-A-2004-184852 (Patent Document 1), a technique in which the amount of light from LEDs as light sources is detected by optical sensors (photosensors) to adjust the white balance in accordance with the detected amount of light, or a technique in which a wavelength detection function that detects wavelength information of LED is given to the optical sensors are described. In JP-A-2007-87816 (Patent Document 2), there is disclosed a technique in which a junction temperature of the LED is measured by a temperature sensor as a peripheral temperature to adjust setting items (values concerning power feeding to the LED) in accordance with data of the setting items which is previously stored based on the measured peripheral temperature.

SUMMARY OF THE INVENTION

However, the optical sensor having the wavelength detection function is generally expensive, and is not adequate for miniaturization. The light-emitting wavelength of the LED varies according to change of drive current supplied to the LED or temperature change. Therefore, for example, in the case that the light-emitting efficiency of the LED is changed due to secular change, the color balance is lost due to change of the light-emitting wavelength even when drive current is adjusted for compensating the change (lowering) of the amount of light. Also, in the case that the light-emitting luminance of the LED is changed by a video signal and the like, the color balance is lost because the light-emitting wavelength is changed due to change of the junction temperature of the LED even when the peripheral temperature of the LED is fixed.

Thus, it is desirable to provide a configuration which can appropriately correct deviation in the color balance due to change of the light-emitting wavelength of the light emitting element even when the expensive optical sensor having the wavelength detection function is not used.

A first illumination device according to an embodiment of the invention includes a light emitting element to be a light source, a light amount detecting means for detecting the amount of light emitted by the light emitting element, a light emitting element drive means for controlling drive current supplied to the light emitting element so that the difference between the light mount detected by the light amount detecting means and a light amount target value becomes small, a junction temperature detecting means for calculating junction temperature of the light emitting element, and a setting means for setting the light amount target value in accordance with the junction temperature detected by the junction temperature detecting means.

A first display device according to an embodiment of the invention includes an illumination device irradiating light, a light modulation means for modulating light irradiated by the illumination device, and a projection means for projecting light modulated by the light modulation means, in which the illumination device has a light emitting element to be a light source, a light amount detecting means for detecting the amount of light emitted by the light emitting element, a light emitting element drive means for controlling drive current supplied to the light emitting element so that the difference between the light mount detected by the light amount detecting means and a light amount target value becomes small, a junction temperature detecting means for calculating junction temperature of the light emitting element, and a setting means for setting the light amount target value in accordance with the junction temperature detected by the junction temperature detecting means.

In the first illumination device and the first display device according to the embodiments of the invention, the light mount target value to be applied to the light emitting element is set in accordance with the junction temperature of the light emitting element detected by the junction temperature detecting means as well as drive current to the light emitting element is controlled by the light emitting element drive means so that the light amount of the light emitting element detected by the light amount detecting means corresponds to the set light amount target value.

In a second illumination device of an embodiment of the invention, which is according to the first illumination device, the setting means sets the light amount target value based on the difference between a first junction temperature detected by the junction temperature detecting means in a state that the light emitting element is driven in a first drive condition and a second junction temperature detected by the junction temperature detecting means in a state that the light emitting element is driven in a second drive condition.

In a second display device of an embodiment of the invention, which is according to the first display device, the setting means sets the light amount target value based on the difference between a first junction temperature detected by the junction temperature detecting means in a state that the light emitting element is driven in a first drive condition and a second junction temperature detected by the junction temperature detecting means in a state that the light emitting element is driven in a second drive condition.

In the second illumination device and the second display device according to the embodiments of the invention, the light amount target value is set based on the difference between junction temperatures detected when the light emitting element is driven in different drive conditions.

In a third illumination device of an embodiment of the invention, which is according to the second illumination device, the first drive condition is the optimum drive condition of the light emitting element which has been previously set.

In a third display device of an embodiment of the invention, which is according to the second display device, the first drive condition is the optimum drive condition of the light emitting element which has been previously set.

In the third illumination device and the third display device according to the embodiments of the invention, the light amount target value is set based on the difference between the junction temperature in a state that the light emitting element is driven in the optimum driven condition and the junction temperature in a state that the light emitting element is driven in a drive condition which is different from the optimum drive condition.

In a fourth illumination device of an embodiment of the invention, which is according to the first illumination device, the light emitting element has a red-light emitting element generating light of a red wavelength component, a green-light emitting element generating light of a green wavelength component and a blue-light emitting element generating light of a blue wavelength component.

In a fourth display device of an embodiment of the invention, in which is according to the first display device, the light emitting element has a red-light emitting element generating light of a red wavelength component, a green-light emitting element generating light of a green wavelength component and a blue-light emitting element generating light of a blue wavelength component.

In the fourth illumination device and the fourth display device according to the embodiments of the invention, the light amount target value is set in accordance with the junction temperature of the light emitting element by respective light emitting elements having different light emitting colors.

In a fifth illumination device of an embodiment of invention, which is according to the fourth illumination device, the setting means sets the light amount target value to be applied to the light emitting element by each light emitting element of one color by using three temperature correction functions prepared for each light emitting color.

In a fifth display device of an embodiment of invention, in which is according to the fourth display device, the setting means sets the light amount target value to be applied to the light emitting element by each light emitting element of one color by using three temperature correction functions prepared for each light emitting color.

In the fifth illumination device and the fifth display device according to the embodiments of the invention, the light amount target values applied to light emitting elements of respective colors are set by using three temperature correction functions prepared for respective light emitting colors.

In a sixth illumination device of an embodiment of the invention, in which is according to the first illumination device, the junction temperature detecting means includes a current reading means for reading drive current supplied to the light emitting element, a voltage reading means for reading drive voltage applied to the light emitting element, a temperature measuring means for measuring peripheral temperature of the light emitting element, a storage means for storing thermal resistance between the light emitting element and the temperature measuring means, and a computing means for calculating junction temperature of the light emitting element by using the drive current read by the current reading means, the drive voltage read by the voltage reading means, the peripheral temperature measured by the temperature measuring means and the thermal resistance stored in the storage means.

In a sixth display device of an embodiment of the invention, in which is according to the first display device, the junction temperature detecting means includes a current reading means for reading drive current supplied to the light emitting element, a voltage reading means for reading drive voltage applied to the light emitting element, a temperature measuring means for measuring peripheral temperature of the light emitting element, a storage means for storing thermal resistance between the light emitting element and the temperature measuring means, and a computing means for calculating junction temperature of the light emitting element by using the drive current read by the current reading means, the drive voltage read by the voltage reading means, the peripheral temperature measured by the temperature measuring means and the thermal resistance stored in the storage means.

In the sixth illumination device and the sixth display device according to the embodiments of the invention, the junction temperature of the light emitting element is detected in the state that the light emitting element is driven (lighted) by supplying drive current from the light emitting element drive means.

In the first illumination device and the first display device according to the embodiment of the invention, for example, even when the junction temperature of the light emitting element is changed according to change of peripheral temperature, light emitting luminance and the like of the light emitting element, drive current to the light emitting element is controlled so that the light amount (light emitting amount) of the light emitting element corresponds to the light amount target value set in accordance with the junction temperature, therefore, the light amount of the light emitting element can be appropriately maintained.

In the second illumination device and the second display device according to the embodiments of the invention, the light amount target value is set (setting change when the light amount target value has been already set) based on the difference between junction temperatures detected when the light emitting element is driven in different drive conditions, therefore, it is possible to appropriately set (or change) the light amount target value in accordance with the change of the junction temperature associated with the difference of the drive condition.

In the third illumination device and the third display device according to the embodiments of the invention, it is possible to appropriately set the light amount target value (setting change when the light amount target value has been already set) according to changes of the junction temperature of the light emitting element when the light emitting element is driven in the optimum drive condition and when the light emitting element is drive in other drive conditions.

In the forth illumination device and the fourth display device according to the embodiments of the invention, it is possible to appropriately maintain color balance of light obtained by adding (combining) lights generated by the light emitting elements of respective colors by setting the light amount target value in accordance with junction temperatures of respective light emitting elements. Therefore, even when a light emitting wavelength of the light emitting element changes with change of, for example, the peripheral temperature or the light emitting luminance of the light emitting element, deviation (particularly, losing of white balance) in the color balance caused by the change of the light emitting wavelength of the light emitting element can be appropriately corrected without an expensive optical sensor having a wavelength detection function).

In the fifth illumination device and the fifth display device according to the embodiments of the invention, it is possible to appropriately set light amount values to be applied to respective light emitting elements so that the color balance of light obtained by adding (combining) lights generated by the light emitting elements of respective colors is fixed.

In the sixth illumination device and the sixth display device according to the embodiments of the invention, it is possible to detect the junction temperature of the light emitting elements in real time.

DESCRIPTION OF THE PREFERRED EMBODIMENTS

Hereinafter, specific embodiments of the invention will be explained in detail with reference to the drawings. Note that the technical range of the invention is not limited to the embodiments described below and includes forms to which various modifications and improvement are added within a scope in which specific advantages obtained by constituent features of the invention or combination thereof can be derived.

Figure 1:
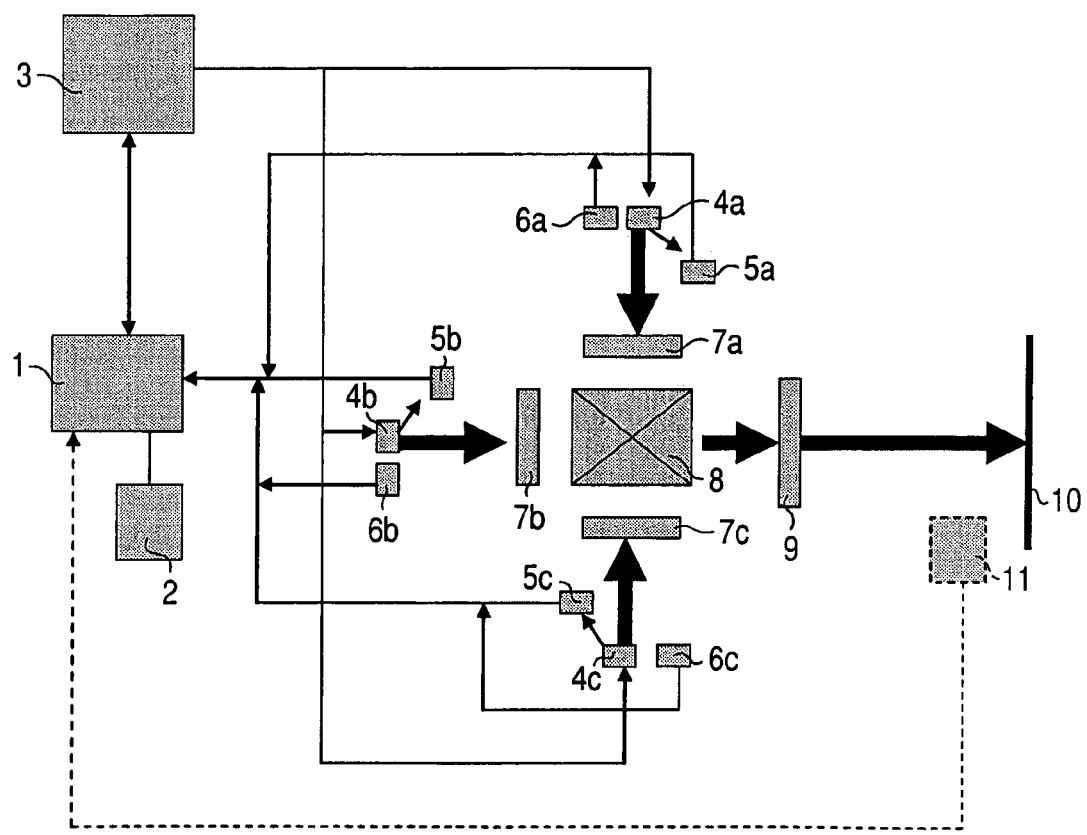
FIG. 1 is a schematic diagram showing a configuration example of a display device according to an embodiment of the invention.

FIG. 1 is a schematic diagram showing a configuration example of a display device according to an embodiment of the invention. The shown display device is a projection-type display device, including a computing unit 1, a storage unit 2, a LED drive unit 3, LEDs 4, optical sensors 5, temperature sensors 6, light modulation devices 7, a light combining device 8, and a projection lens 9. The LEDs 4, the optical sensors 5, the temperature sensors 6 and the light modulation devices 7 are separately provided with respect to respective color components (light emitting colors) of red, green and blue which are three primary colors of light.

That is to say, the LEDs 4 are provided separately as a LED 4a corresponding to a red wavelength component, a LED 4b corresponding to a green wavelength component and a LED 4c corresponding to a blue wavelength component. The optical sensors 5 are provided separately as an optical sensor 5a corresponding to a red wavelength component, an optical sensor 5b corresponding to a green wavelength component and an optical sensor 5c corresponding to a blue wavelength component. Similarly, the temperature sensors 6 are provided separately as a temperature sensor 6a corresponding to a red wavelength component, a temperature sensor 6b corresponding to a green wavelength component and a temperature sensor 6c corresponding to a blue wavelength component, additionally, the light modulation devices 7 are provided separately as a light modulation device 7a corresponding to a red wavelength component, a light modulation device 7b corresponding to a green wavelength component and a light modulation component 7c corresponding to a blue wavelength component.

The computing unit 1 outputs a control signal to the LED drive unit 3 so that the color balance including the white balance becomes optimum by using light amount data obtained from respective optical sensors 5a, 5b and 5c, temperature data obtained from respective temperature sensors 6a, 6b and 6c, further, data in which inter-terminal voltages and drive currents of respective LEDs 4a, 4b and 4c obtained from the LED drive unit 3 is A/D converted and data stored in the storage unit 2.

The storage unit 2 is used for storing various data including data necessary for adjusting the color balance by the computing unit 1.

The LED drive unit 3 allows respective LEDs 4a, 4b and 4c to emit light (to be lit) by supplying drive currents to respective LEDs 4a, 4b and 4c as well as changes (increase and decrease) drive currents supplied to respective LEDs 4a, 4b and 4c based on a control signal given from the computing unit 1.

The LED 4 is a light emitting element to be a light source for the illumination device according to an embodiment of the invention. The light emitting element includes three-types of LEDs 4a, 4b and 4c having different light emitting colors. More specifically, the LED 4a is a red-light emitting element generating light of a red wavelength component, the LED 4b is a green-light emitting element generating light of a green wavelength component and the LED 4c is a blue-light emitting element generating light of a blue wavelength component. Respective LEDs 4a, 4b and 4c may include one LED, respectively, or plural LEDs may be formed as a one group. It is also preferable that a semiconductor laser (LD) as a light source of the illumination device.

The optical sensor 5 is a light amount detecting means for detecting the amount of light (light intensity) emitted by the LED 4. More specifically, the optical sensor 5a is a light amount detecting means for detecting the light amount of a red wavelength component generated by the LED 4a, the optical sensor 5b is a light amount detecting means for detecting the light amount of a green wavelength component generated by the LED 4b and the optical sensor 5c is a light amount detecting means for detecting the light amount of a blue wavelength component. The above optical sensor 5 is formed by using, for example, a photo diode outputting current in proportion to the received amount of light.

The temperature sensor 6 is a temperature measuring means for measuring peripheral temperature of the LED 4. More specifically, the temperature sensor 6a is a temperature measuring means for measuring peripheral temperature of the LED 4a, the temperature sensor 6b is a temperature measuring means for measuring peripheral temperature of the LED 4b and the temperature sensor 6c is a temperature measuring means for measuring peripheral temperature of the LED 4c.

The peripheral temperature of the LED 4 is a temperature in the vicinity of the LED 4, which is the temperature specifically defined as follows. That is, generally, the LED 4 has a structure in which a LED chip functions as the LED 4 is sealed in a hollow package (sealing body) in an airtight state. Therefore, the LED 4 and the package sealing the LED 4 are in a state that they are thermally connected. In such case, the peripheral temperature of the LED 4 corresponds to the temperature of the package which seals the LED chip. The package temperature may be, for example, the temperature inside the package, the temperature of the package itself or the temperature outside the package provided that it is the position in the vicinity of the LED 4 as well as calculation of heat conductivity is possible. Particularly, it is desirable that the peripheral temperature of the LED 4 is the temperature of the position near the LED 4 to be a heating source when calculating a later-described junction temperature accurately. In general, the LED 4 is used by being combined with a heat release body such as a heat sink. In such case, assume that a mounting member (a member having heat conductivity) is used for mounting the package of the LED 4 on the heat release body, the temperature sensor 6 is provided in the same surface as an attaching surface of the mounting member to which the package of the LED4 is attached (preferably, a position near the package of the LED4), and the temperature measured by the temperature sensor 6 is dealt with as the peripheral temperature of the LED4.

The light modulation device 7 is a light modulation means modulating light on an optical path of light generated by the LED 4. More specifically, the light modulation device 7a is a light modulation means allowing light of a red wavelength component generated by the LED 4a to selectively transmit (or reflect), the light modulation device 7b is a light modulation means allowing light of a green wavelength component generated by the LED 4b to selectively transmit (or reflect) and the light modulation device 7c is a light modulation means allowing light of a blue wavelength component generated by the LED 4c to selectively transmit (or reflect). The modulation of light by the modulation device 7 is performed based on a video signal. In this case, assume that each of light modulation devices 7a, 7b and 7c includes a transmissive liquid crystal device (LCD) and a polarizing plate. However, the invention is not limited to this, and for example, a reflective liquid crystal device and the polarizing plate or a DMD (digital mirror device) can be used as a light modulation device.

The light combining device 8 combines light of respective color components which is incident from respective LEDs 4a, 4b and 4c through the light modulation devices 7a, 7b and 7c corresponding to respective LEDs. The light combining device 8 is formed by using, for example, a light combining prism.

The projection lens 9 projects light (combined light of three colors) radiated from the light combining device 8 on a screen 10.

In the display device including the above configuration, lights emitted at the LEDs 4a, 4b and 4c are incident to light modulation devices 7a, 7b and 7c corresponding to respective LEDs and lights optically modulated so as to correspond to video signals according to color components are combined at the light combining device 8. Further, light combined at the light combining device 8 is outputted to the projection lens 9 and video enlarged at the projection lens 9 (still pictures, moving pictures and the like) is projected on the screen 10. At that time, drive currents given to respective LEDs 4a, 4b and 4c are adjusted by the LED drive unit 3 in accordance with a control signal outputted from the computing unit 1.

Respective optical sensors 5a, 5b and 5c receive part of light generated by the LED 4a, 4b and 4c corresponding to respective optical sensors to generate currents in proportion to the amount of received light. The computing unit 1, after converting current outputted from respective optical sensors 5a, 5b and 5c into voltages, reads data which has been A/D converted by a not-shown A/D converter as light amount data. Accordingly, light amount data detected by the optical sensor 5a is taken by the computing unit 1 as the light emitting amount of the LED 4a. Similarly, light amount data detected by the optical sensor 5b is taken by the computing unit 1 as light emitting amount of the LED 4b and light amount data detected by the optical sensor 5c is taken by the computing unit 1 as the light emitting amount of the LED 4c.

Respective temperature sensors 6a, 6b and 6c convert temperatures measured by the sensor themselves into electric signals and output them. The computing unit 1 reads electric signals outputted from respective temperature sensors 6a, 6b and 6c as temperature data of peripheral temperatures of the LEDs 4a, 4b and 4c corresponding to respective temperature sensors. Accordingly, temperature data measured by the temperature sensor 6a is taken by the computing unit 1 as the peripheral temperature of the LED 4a. Similarly, temperature data measured by the temperature sensor 6b is taken by the computing unit 1 as the peripheral temperature of the LED 4b, and temperature data measured by the temperature sensor 6c is taken by the computing unit 1 as the peripheral temperature of the LED 4c.

In such operation state, the color balance of white light projected from the projection lens 9 on the screen 10, namely, the white balance can be adjusted by changing drive currents supplied from the LED drive unit 3 to respective LEDs 4a, 4b and 4c. Therefore, the LED drive unit 3 performs a so-called white balance adjustment in which drive currents to be supplied to respective LEDs 4a, 4b and 4c are changed in accordance with a control signal outputted from the computing unit 1 so that white light projected on the screen 10 has desired chroma, usually when the display device is shipped as a product. In order to perform the adjustment, a chroma measure 11 for measuring chroma of video (a white picture) projected on the screen 10 becomes necessary. The chroma data measured by the chroma measure 11 is read by the computing unit 1. Note that the chroma measure 11 is necessary for adjusting the color balance, however, it is not necessary when the display device is actually used. That is, the chroma measure 11 is a measure for adjusting the color balance which is necessary at the time of factory shipping (or at the time of readjustment after shipping) and the like.

Figure 2:
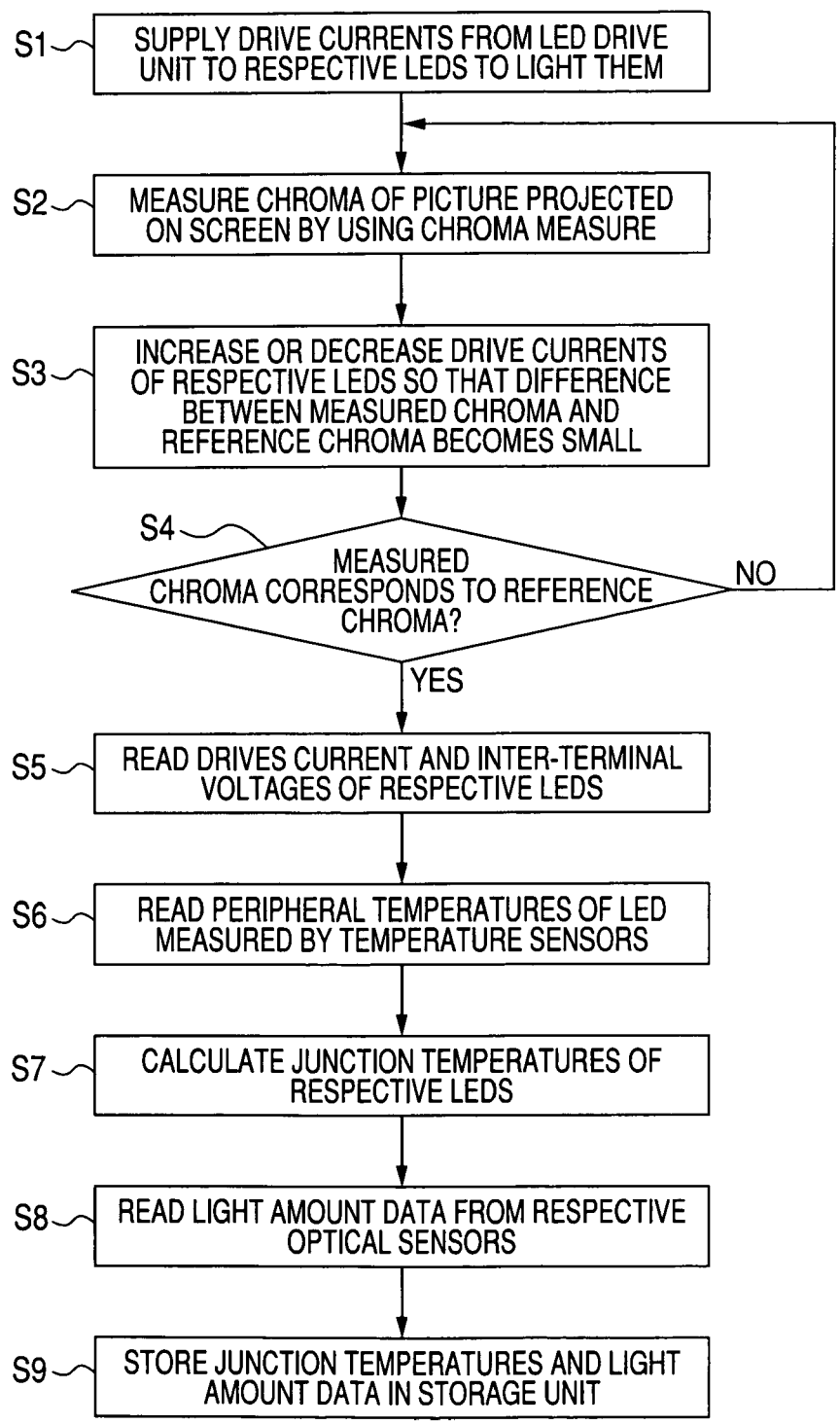
FIG. 2 is a flowchart showing a procedure of adjustment processing of color balance of the display device which is performed at the time of factory shipping.

FIG. 2 is a flowchart showing a procedure of adjustment processing of the color balance (white balance) of the display device performed at the factory shipping. First, prescribed drive currents (for example, drive currents set by default) are individually supplied from the LED drive unit 3 to respective LEDs 4a, 4b and 4c to light the respective LEDs 4a, 4b and 4c (Step S1). At this time, the light modulation devices 7a, 7b and 7c performs modulation of light so as to transmit incident light as it is in accordance with a video signal for adjusting the color balance (video signal for white display). Accordingly, lights emitted at respective LEDs 4a, 4b and 4c are combined at the light combining device 8 through the light modulation devices 7a, 7b and 7c corresponding to respective LEDs and the combined light is projected on the screen 10 by the projection lens 9.

Next, the chroma of a picture (video) projected on the screen 10 is measured by using the chroma measure 11 (Step S2). The chroma data measured by the chroma measure 11 is taken by the computing unit 1.

Next, the computing unit 1 outputs a control signal designating the adjustment amount of drive current to the LED drive unit 3 so that the difference between chroma measured by the chroma measure 11 and the reference chroma which is previously set (chroma supposed to be optimum) becomes small, thereby adjusting (increasing or decreasing) drive currents supplied from the LED drive unit 3 to respective LEDs 4a, 4b and 4c (Step S3). The reference chroma is chroma at which the white balance of video (same meaning as a picture) displayed by projecting light on the screen 10 is optimum. It is preferable that data of the reference chroma is stored in the storage unit 2 in advance and read by the computing unit 1, or it is also preferable that data is inputted in the computing unit 1 at the time of adjustment.

Next, the computing unit 1 determines whether the chroma measured by the chroma measure 11 corresponds to the reference chroma or not (Step S4), and when it does not correspond, the process returns to the above Step S2. When the measured chroma corresponds to the reference chroma, the computing unit 1 reads drive currents supplied from the LED drive unit 3 to respective LEDs 4a, 4b and 4c and inter-terminal voltages of respective LEDs 4a, 4b and 4c in the drive state at that time, namely, in a state in which respective LEDs 4a, 4b and 4c are driven in the optimum drive condition (condition in which color balance of three colors becomes optimum) (Step S5). The "optimum drive condition of the LED" described here means the drive condition of the LED in a state in which the color balance is adjusted so that the chroma measured by the chroma measure 11 corresponds to the reference chroma which is previously set.

Next, the computing unit 1 reads peripheral temperatures of the LEDs 4a, 4b and 4c measured by respective temperature sensors 6a, 6b and 6c (step S6). The temperatures read by the computing unit 1 are the peripheral temperatures of the LEDs 4 in a state in which the adjustment of the color balance has been completed (that is, the state in which the LEDs 4 are driven in the optimum drive condition).

Next, the computing unit 1 calculates junction temperatures of respective LEDs 4a, 4b and 4c by using data of drive currents, inter-terminal voltages and peripheral temperatures of the LEDs taken as the above in accordance with formulas (1) to (3) below (Step S7). The junction temperature calculated here corresponds to a "first junction temperature".

$$Tj0a = I0a \times V0a \times Tj\text{-}\theta + T0a \quad (1)$$

$$Tj0b = I0b \times V0b \times Tj\text{-}\theta + T0b \quad (2)$$

$$Tj0c = I0c \times V0c \times Tj\text{-}\theta + T0c \quad (3)$$

In the above formula (1), "$Tj0a$" is a junction temperature of the LED 4a, "$I0a$" is a drive current of the LED 4a, "$V0a$" is an inter-terminal voltage of the LED 4a, "$Tj\text{-}\theta$" is a thermal resistance between the LED 4a and the temperature sensor 6a and "$T0a$" is a peripheral temperature of the LED 4a measured by the temperature sensor 6a. Similarly, in the above formula (2), "$Tj0b$" is a junction temperature of the LED 4b, "$I0b$" is a drive current of the LED 4b, "$V0b$" is an inter-terminal voltage of the LED 4b, "$Tj\text{-}\theta$" is a thermal resistance between the LED 4b and the temperature sensor 6b and "$T0b$" is a peripheral temperature of the LED 4b measured by the temperature sensor 6b. Further, in the above formula (3), "$Tj0c$" is a junction temperature of the LED 4c, "$I0c$" is a drive current of the LED 4c, "$V0c$" is an inter-terminal voltage of the LED 4c, "$Tj\text{-}\theta$," is a thermal resistance between the LED 4c and the temperature sensor 6c and "$T0c$" is a peripheral temperature of the LED 4c measured by the temperature sensor 6c.

The junction temperature of the LED is a temperature of a pn junction of the LED which is a semiconductor light emitting device. The inter-terminal voltage of the LED is drive voltage applied to the LED, strictly, corresponding to anode-cathode voltage of the LED. It is preferable that the inter-terminal voltage is applied by being read from the storage unit 2 in which a value measured by using a measure in advance in stored, or that it is measured in the actual operation state. Since the inter-terminal voltage of the LED does not change after it is set once, for example, it can be used if necessary by reading from the storage unit 2 in which a measured value measured at the time of factory shipping is stored. Additionally, the individual difference of the inter-terminal voltages of the LEDs 4 is extremely small, therefore, a fixed voltage value previously determined by specifications of the LED 4 can be used for calculating the junction temperature as a "terminal voltage" by storing the value in the storage unit 2 or incorporating the value in a program for computing. When the inter-terminal voltage is actually measured, voltage between terminals to which two wirings used for supplying drive current by the LED drive unit 3 to the LED 4 can be measured instead of the anode-cathode voltage of the LED 4. The thermal resistance "$Tj\text{-}\theta$" is calculated by simulation based on a material, a shape and the like of the LED 4. The thermal resistance is stored in the storage unit 2 and read by the computing unit 1 if necessary. In the case that the setting condition in the LEDs 4 and the temperature sensors 6 are common to all respective color components of RGB, a common value will be applied concerning the thermal resistance "$Tj\text{-}\theta$". When the chip of the LED 4 having the temperature sensor function is used, a value of the thermal resistance provided by a manufacturer manufacturing the LED chip can be used.

Next, the computing unit 1 reads light amount data S0a, S0b and S0c from respective optical sensors 5a, 5b and 5c (Step S8). The light amount data read by the computing unit 1 is the light amount of the LED 4 in the state in which the adjustment of color balance has been completed as described above. The light amount data S0a is light amount data of the LED 4a read from the optical sensor 5a, the light amount data S0b is the light amount data of the LED 4b read from the optical sensor 5b and light amount data S0c is light amount data of the LED 4c read by the optical sensor 5c.

Next, the computing unit 1 stores the junction temperatures Tj0a, Tj0b and Tj0c calculated in the above Step S7 and the light mount data S0a, S0b and S0c read in the above Step S8 in the storage unit 2, respectively (Step S9). That is the end of the adjustment processing at the time of factory shipping. The electrical connection between the computing unit 1 and the chroma measure 11 is cut off after the adjustment processing is completed.

Figure 3:
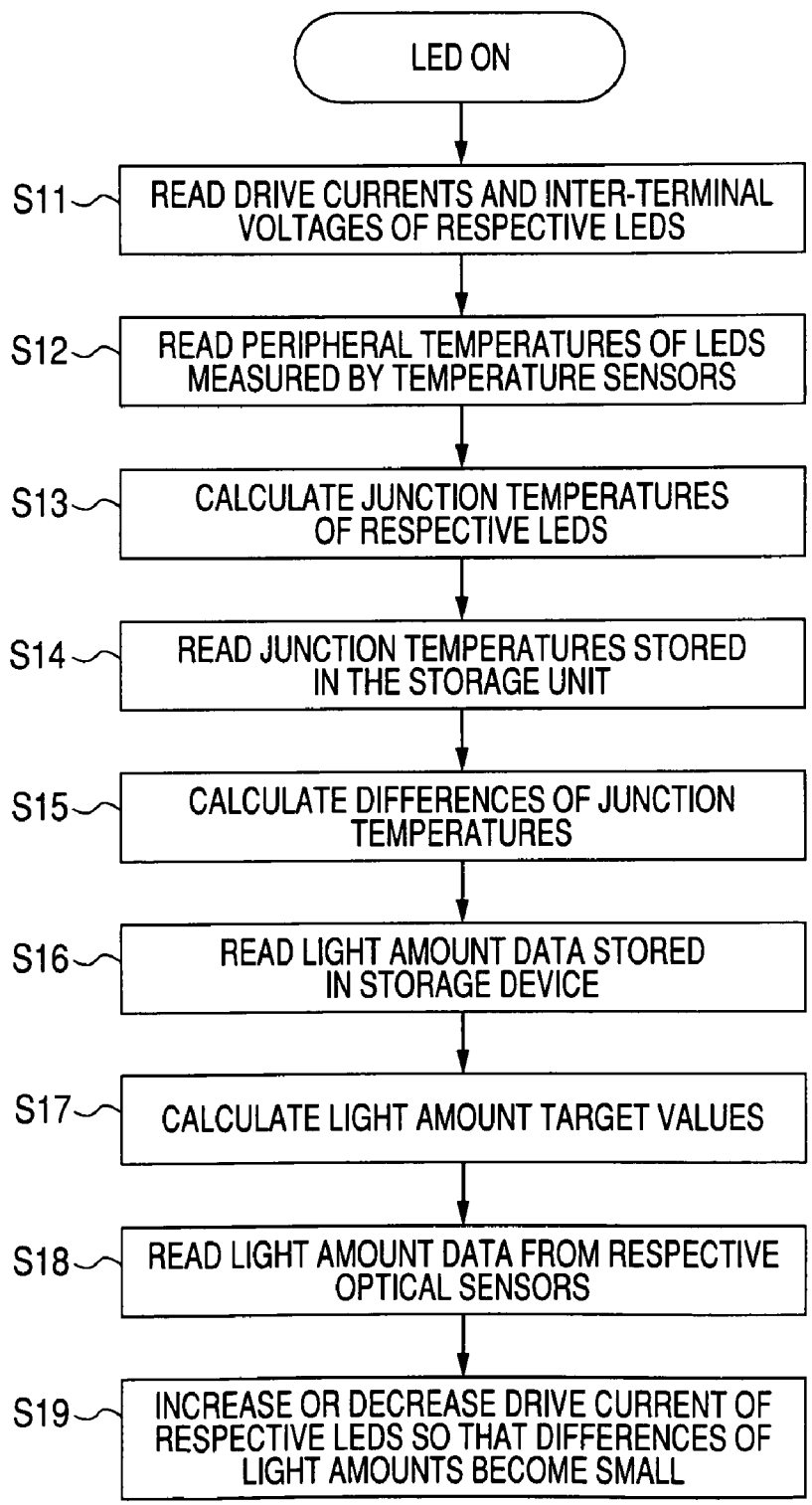
FIG. 3 is a flowchart showing a procedure of control processing of the display device which is performed at the time of normal use.

FIG. 3 is a flowchart showing a procedure of control processing of the display device performed at the time of normal use. The normal use means a stage in which the display device is normally operated to be used at least after the adjustment of the color balance has been completed (usually, a stage in which the display device is used in accordance with an operation manual by a user who purchased the display device).

First, drive currents are supplied from the LED drive unit 3 to respective LEDs 4a, 4b and 4c in accordance with the control signal outputted from the computing unit 1, thereby, the computing unit 1 reads drive currents Ia, Ib and Ic supplied from the LED drive unit 3 to respective LEDs 4a, 4b, 4c and the inter-terminal voltages Va, Vb, Vc of respective LEDs 4a, 4b, 4c (Step S11) in a state in which respective LEDs 4a, 4b and 4c are lighted (on), namely, in the state in which respective LEDs are driven in the normal drive condition (second drive condition).

Next, the computing unit 1 reads the peripheral temperatures Ta, Tb and Tc of the LEDs 4a, 4b and 4c measured by respective temperature sensors 6a, 6b and 6c (Step S12).

Next, the computing unit 1 calculates junction temperatures Tja, Tjb and Tjc of respective LEDs 4a, 4b and 4c (Step S13) based on the following formulas (4) to (6) by using data of drive currents Ia, Ib and Ic inter-terminal voltages Va, Vb and Vc read in the above Step S11 as well as peripheral temperatures Ta, Tb and Tc read in the above Step S12. The junction temperature calculated here corresponds to the "second junction temperature".

$$Tja = Ia \times Va \times Tj\text{-}\theta + Ta \quad (4)$$

$$Tjb = Ib \times Vb \times Tj\text{-}\theta + Tb \quad (5)$$

$$Tjc = Ic \times Vc \times Tj\text{-}\theta + Tc \quad (6)$$

Next, the computing unit 1 reads junction temperatures Tj0a, Tj0b and Tj0c of respective LED 4a, 4b and 4c stored in the storage unit 2 (Step S14).

Next, the computing unit 1 calculates differences ΔTja, ΔTjb, and ΔTjc between the junction temperatures Tja, Tjb and Tjc calculated in the actual use state and the junction temperatures Tj0a, Tj0b and Tj0c read from the storage unit 2 by each light emitting wavelength component (light emitting colors) of the LED 4a, 4b and 4c in accordance with the following formulas (7) to (9) (Step S15).

$$\Delta Tja = Tja - Tj0a \quad (7)$$

$$\Delta Tjb = Tjb - Tj0b \quad (8)$$

$$\Delta Tjc = Tjc - Tj0c \quad (9)$$

Next, the computing unit 1 reads light amount data S0a, S0b and S0c of respective optical sensors 5a, 5b and 5c stored in the stored unit 2 (Step S16).

Next, the computing unit 1 calculates light amount target values Sta, Stb and Stc of respective optical sensors 5a, 5b and 5c in accordance with the following formulas (10) to (12) (Step S17) by using temperature correction functions faa(Δt), fab(Δt), fac(Δt), fba(Δt), fbb(Δt), fbc(Δt), fca(Δt), fcb(Δt), and fcc(Δt) with respect to respective light emitting colors, which have been experimentally obtained from characteristics of respective LEDs 4a, 4b and 4c in advance. The light amount target value Sta is applied to the LED 4a. The light target value Stb is applied to the LED 4b and the light amount target value Stc is applied to the LED 4c. Accordingly, the setting of the light amount target value is made by each light emitting color.

$$Sta = S0a \times (faa(\Delta Tja) + fab(\Delta Tjb) + fac(\Delta Tjc) + 1) \quad (10)$$

$$Stb = S0b \times (fba(\Delta Tja) + fbb(\Delta Tjb) + fbc(\Delta Tjc) + 1) \quad (11)$$

$$Stc = S0c \times (fca(\Delta Tja) + fcb(\Delta Tjb) + fcc(\Delta Tjc) + 1) \quad (12)$$

In the above formulas (10) to (12), the temperature correction function is a function of prescribing to what degree the light amounts of respective LEDs 4a, 4b and 4c are corrected for keeping the color balance to be fixed before and after change of the junction temperature in the case that the junction temperature of a certain LED 4 is changed by ΔT. More specifically, the temperature correction function faa (Δt) is a function of prescribing the rate of light amount correction of the LED 4a with respect to the junction temperature variation (ΔTja) of the LED 4a generating light of the red wavelength component, the temperature correction function fab (Δt) is a function of prescribing the rate of light amount correction of the LED 4a with respect to the junction temperature variation (ΔTjb) of the LED 4b generating light of the green wavelength component and the temperature correction function fac (Δt) is a function of prescribing the rate of light amount correction of the LED 4a with respect to the junction temperature variation (ΔTjc) of the LED 4c generating light of the blue wavelength component.

The temperature correction function fba (Δt) is a function of prescribing the rate of light amount correction of the LED 4b with respect to the junction temperature variation (ΔTja) of the LED4a generating light of the red wavelength component, the temperature correction function fbb (Δt) is a function of prescribing the rate of light amount correction of the LED 4b with respect to the junction temperature variation (ΔTjb) of the LED4b generating light of the green wavelength component, and the temperature correction function fbc (Δt) is a function of prescribing the rate of light amount correction of the LED 4b with respect to the junction temperature variation (ΔTjc) of the LED4c generating light of the blue wavelength component.

The temperature correction function fca (Δt) is a function of prescribing the rate of light amount correction of the LED 4c with respect to the junction temperature variation (ΔTja) of the LED4a generating light of the red wavelength component, the temperature correction function fcb (Δt) is a function of prescribing the rate of light amount correction of the LED 4c with respect to the junction temperature variation (ΔTjb) of the LED4b generating light of the green wavelength component, and the temperature correction function fcc (Δt) is a function of prescribing the rate of light amount correction of the LED 4c with respect to the junction temperature variation (ΔTjc) of the LED4c generating light of the blue wavelength component.

The reason that the temperature correction function with respect to each light emitting color of the LED 4 is used is that it is desirable that not only the light amount of the LED 4 in which the junction temperature has been changed but also light amounts of respective LEDs 4a, 4b and 4c are corrected at the same time in order to maintain the color balance to be fixed even when the junction temperature of the LED 4 is changed, in the case that the adjustment of the color balance including the white balance is performed by increasing or decreasing light amounts of respective LEDs 4a, 4b and 4c. Therefore, three temperature correction functions are prepared for each LED of one color. However, the invention is not limited to this, and it is preferable that one temperature correction function is prepared for the LED of one color so as to correct only the light amount of the LED 4 in which the junction temperature has been changed. Assuming that all values of the temperature correction functions are 0 (zero), the light amount data S0a, S0b and S0c at the time of factory shipping, which has been read from the storage unit 2 are set as the light amount target values Sta, Stb and Stc as they are.

Next, the computing unit 1 reads the light amount data Sa, Sb and Sc from respective optical sensors 5a, 5b and 5c (Step S18).

Next, the computing unit 1 adjusts (increases or decreases) drive currents supplied from the LED drive unit 3 to respective LEDs 4a, 4b and 4c (Step S19) by outputting the control signal designating adjustment amounts of drive currents to the LED drive unit 3 so that differences between the light amount data Sa, Sb and Sc of respective optical sensors 5a, 5b and 5c read in the above Step S18 and the light mount target values Sta, Stb and Stc set in the above Step S17 become small (ideally, so as to be Sa=Sta, Sb=Stb and Sc=Stc).

When the LED drive unit 3 adjusts drive currents to be supplied to respective LEDs 4a, 4b and 4c based on the control signal from the computing unit 1, in the case that the drive current is supplied to the LED in a form of a pulse waveform, it is possible to adjust the drive current by changing a peak current value (wave height value) or the duty ratio of pulse waves. Particularly, it is preferable that the duty ratio of pulse waves is changed for suppressing change of the light emitting wavelength of the LED (change of chroma) associated with the adjustment of drive current.

The display device is operated in accordance with the control processing as described above, thereby maintaining the color balance adjusted so as to be a desired chroma at the time of factory shipping in that state even in a normal use. Therefore, it is possible to appropriately correct deviation in the color balance associated with change of the peripheral temperature of the LED, luminance change of the LED, or secular change of characteristics of the LED.

In the above embodiment, the case that the white balance is adjusted as an example of the color balance has been explained, however, the invention is not limited to this, and it can be applied to cases that color balances other than white color are adjusted.

Also in the above embodiment, the function of setting the light mount target value in accordance with the junction temperature is allowed to be possessed by all three types of LEDs 4a, 4b and 4c having different light emitting colors, however, the invention is not limited to this, and it is preferable that only one or two types of LEDs are allowed to have the above setting function, and that drive current is controlled by taking the light amount data which is read in the adjustment at the time of factory shipping as the light mount target value with respect to the LED which does not have the setting function.

The illumination device according to an embodiment of the invention is not limited to the one used for a projection-type display device but, for example, the illumination device used for a display device such as a direct-view type LCD which requires the illumination device.

It should be understood by those skilled in the art that various modifications, combinations, sub-combinations and alternations may occur depending on design requirements and other factors insofar as they are within the scope of the appended claims or the equivalents thereof.

What is claimed is:

1. An illumination device comprising:
a light emitting element to be a light source;
a light amount detecting means for detecting the amount of light emitted by the light emitting element;
a light emitting element drive means for controlling drive current supplied to the light emitting element so that the difference between the light mount detected by the light amount detecting means and a light amount target value becomes small;
a junction temperature detecting means for calculating junction temperature of the light emitting element; and
a setting means for setting the light amount target value in accordance with the junction temperature detected by the junction temperature detecting means,
in which the light emitting element has three color emitting elements including a red-light emitting element generating light of a red wavelength component, a green-light emitting element generating light of a green wavelength component and a blue-light emitting element generating light of a blue wavelength component, and
in which the setting means sets the light amount target value to be applied to each color emitting element of the light emitting element by using three temperature correction functions for each said color light emitting element each pertaining to a function involving the respective color emitting element and junction temperature variation of one of the three color emitting elements such that for a first color emitting element three respective temperature correction functions are utilized which include a first temperature correction function pertaining to a function involving the first color emitting element and junction temperature variation of the first color emitting element, a second temperature correction function pertaining to a function involving the first color emitting element and junction temperature variation of a second color emitting element, and a third temperature correction function pertaining to a function involving the first color emitting element and junction temperature variation of a third color emitting element.

2. The illumination device according to claim 1,
wherein the light amount target value is based on the difference between a first junction temperature detected by the junction temperature detecting means in a state that the light emitting element is driven in a first drive condition and a second junction temperature detected by the junction temperature detecting means in a state that the light emitting element is driven in a second drive condition.

3. The illumination device according to claim 2,
wherein the first drive condition is the optimum drive condition of the light emitting element which has been previously set.

4. The illumination device according to claim 1,
wherein the junction temperature detecting means includes
a current reading means for reading drive current supplied to the light emitting element,
a voltage reading means for reading drive voltage applied to the light emitting element,
a temperature measuring means for measuring peripheral temperature of the light emitting element,
a storage means for storing thermal resistance between the light emitting element and the temperature measuring means, and
a computing means for calculating junction temperature of the light emitting element by using the drive current read by the current reading means, the drive voltage read by the voltage reading means, the peripheral temperature measured by the temperature measuring means and the thermal resistance stored in the storage means.

5. A display device comprising:
an illumination device irradiating light;
a light modulation means for modulating light irradiated by the illumination device; and
a projection means for projecting light modulated by the light modulation means, and
wherein the illumination device includes
a light emitting element to be a light source,
a light amount detecting means for detecting the amount of light emitted by the light emitting element,
a light emitting element drive means for controlling drive current supplied to the light emitting element so that the difference between the light mount detected by the light amount detecting means and a light amount target value becomes small,
a junction temperature detecting means for calculating junction temperature of the light emitting element, and
a setting means for setting the light amount target value in accordance with the junction temperature detected by the junction temperature detecting means,
in which the light emitting element has three color emitting elements including a red-light emitting element generating light of a red wavelength component, a green-light emitting element generating light of a green wavelength component and a blue-light emitting element generating light of a blue wavelength component, and
in which the setting means sets the light amount target value to be applied to each color emitting element of the light emitting element by using three temperature correction functions for each said color light emitting element each pertaining to a function involving the respective color emitting element and junction temperature variation of one of the three color emitting elements such that for a first color emitting element three respective temperature correction functions are utilized which include a first temperature correction function pertaining to a function involving the first color emitting element and junction temperature variation of the first color emitting element, a second temperature correction function pertaining to a function involving the first color emitting element and junction temperature variation of a second color emitting element, and a third temperature correction function pertaining to a function involving the first color emitting element and junction temperature variation of a third color emitting element.

6. The display device according to claim 5,
wherein the light amount target value is set based on the difference between a first junction temperature detected by the junction temperature detecting means in a state that the light emitting element is driven in a first drive condition and a second junction temperature detected by the junction temperature detecting means in a state that the light emitting element is driven in a second drive condition.

7. The display device according to claim 6,
wherein the first drive condition is the optimum drive condition of the light emitting element which has been previously set.

8. The display device according to claim 5,
wherein the junction temperature detecting means includes
a current reading means for reading drive current supplied to the light emitting element,
a voltage reading means for reading drive voltage applied to the light emitting element,
a temperature measuring means for measuring peripheral temperature of the light emitting element,
a storage means for storing thermal resistance between the light emitting element and the temperature measuring means, and
a computing means for calculating junction temperature of the light emitting element by using the drive current read by the current reading means, the drive voltage read by the voltage reading means, the peripheral temperature measured by the temperature measuring means and the thermal resistance stored in the storage means.

9. An illumination device comprising:
a light emitting element to be a light source;
a light amount detecting unit configured to detect the amount of light emitted by the light emitting element;
a light emitting element drive unit configured to control drive current supplied to the light emitting element so that the difference between the light mount detected by the light amount detecting unit and a light amount target value becomes small;
a junction temperature detecting unit configured to calculate junction temperature of the light emitting element; and
a setting unit configured to set the light amount target value in accordance with the junction temperature detected by the junction temperature detecting unit,
in which the light emitting element has three color emitting elements including a red-light emitting element generating light of a red wavelength component, a green-light emitting element generating light of a green wavelength component and a blue-light emitting element generating light of a blue wavelength component, and
in which the setting means sets the light amount target value to be applied to each color emitting element of the light emitting element by using three temperature correction functions for each said color light emitting element each pertaining to a function involving the respective color emitting element and junction temperature variation of one of the three color emitting elements such that for a first color emitting element three respective temperature correction functions are utilized which include a first temperature correction function pertaining to a function involving the first color emitting element and junction temperature variation of the first color emitting element, a second temperature correction function pertaining to a function involving the first color emitting element and junction temperature variation of a second color emitting element, and a third temperature correction function pertaining to a function involving the first color emitting element and junction temperature variation of a third color emitting element.

10. A display device comprising:
an illumination device irradiating light;
a light modulation unit configured to modulate light irradiated by the illumination device; and
a projection unit configured to project light modulated by the light modulation unit, and
wherein the illumination device includes
a light emitting element to be a light source,
a light amount detecting unit configured to detect the amount of light emitted by the light emitting element,
a light emitting element drive unit configured to control drive current supplied to the light emitting element so that the difference between the light mount detected by the light amount detecting unit and a light amount target value becomes small,
a junction temperature detecting unit configured to calculate junction temperature of the light emitting element, and
a setting unit configured to set the light amount target value in accordance with the junction temperature detected by the junction temperature detecting unit,
in which the light emitting element has three color emitting elements including a red-light emitting element generating light of a red wavelength component, a green-light emitting element generating light of a green wavelength component and a blue-light emitting element generating light of a blue wavelength component, and
in which the setting unit sets the light amount target value to be applied to each color emitting element of the light emitting element by using three temperature correction functions for each said color light emitting element each pertaining to a function involving the respective color emitting element and junction temperature variation of one of the three color emitting elements such that for a first color emitting element three respective temperature correction functions are utilized which include a first temperature correction function pertaining to a function involving the first color emitting element and junction temperature variation of the first color emitting element, a second temperature correction function pertaining to a function involving the first color emitting element and junction temperature variation of a second color emitting element, and a third temperature correction function pertaining to a function involving the first color emitting element and junction temperature variation of a third color emitting element.

* * * * *